US007043244B1

(12) United States Patent
Fauconnier (10) Patent No.: US 7,043,244 B1
(45) Date of Patent: May 9, 2006

(54) METHOD AND APPARATUS FOR CHANGING RADIO LINK CONFIGURATIONS IN A MOBILE TELECOMMUNICATIONS SYSTEM WITH SOFT HANDOVER

(75) Inventor: Denis Fauconnier, Saint-Remy lès Chevreuse (FR)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/937,572

(22) PCT Filed: Mar. 24, 2000

(86) PCT No.: PCT/EP00/02673

§ 371 (c)(1),
(2), (4) Date: Jan. 23, 2002

(87) PCT Pub. No.: WO00/60892

PCT Pub. Date: Oct. 12, 2000

(30) Foreign Application Priority Data

Apr. 1, 1999 (EP) .................................. 99400807

(51) Int. Cl.
*H04B 7/00* (2006.01)
*H04Q 7/20* (2006.01)
(52) U.S. Cl. ...................... 455/442; 455/436; 455/525; 370/331
(58) Field of Classification Search ................. 455/442, 455/436–439, 416, 525; 370/331, 328, 466
See application file for complete search history.

(56) References Cited

U.S. PATENT DOCUMENTS

| 5,528,583 | A  | * | 6/1996  | Acampora et al. | .......... 370/256 |
| 5,875,185 | A  | * | 2/1999  | Wang et al.     | ................. 370/331 |
| 5,953,320 | A  | * | 9/1999  | Williamson et al. | ........ 370/252 |
| 6,038,448 | A  | * | 3/2000  | Chheda et al.   | .............. 455/436 |
| 6,125,276 | A  | * | 9/2000  | Lupien          | ....................... 455/436 |
| 6,198,929 | B1 | * | 3/2001  | Krishnamurthi et al. | ..... 455/439 |
| 6,341,124 | B1 | * | 1/2002  | Johansson et al. | .......... 370/335 |
| 6,434,390 | B1 | * | 8/2002  | Rahman          | ..................... 455/440 |
| 6,456,604 | B1 | * | 9/2002  | Lee et al.      | ................... 370/328 |
| 6,505,058 | B1 | * | 1/2003  | Willey          | ........................ 455/574 |
| 6,539,236 | B1 | * | 3/2003  | Hakkinen et al. | ........... 455/525 |
| 6,574,473 | B1 | * | 6/2003  | Rinne et al.    | ................. 455/436 |
| 2002/0037726 | A1 | * | 3/2002 | Czaja et al.   | ................. 455/442 |

FOREIGN PATENT DOCUMENTS

WO    WO 95/22857 A1    8/1995
WO    WO 99/09779 A1    2/1999

* cited by examiner

*Primary Examiner*—William Trost
*Assistant Examiner*—Brandon J. Miller
(74) *Attorney, Agent, or Firm*—Barnes & Thornburg LLP (57) ABSTRACT

A telecommunications system and a method of operating the same are described in which mobile terminals may communicate with base station transceivers over an air interface, a communication to another user terminal being supported in macrodiversity by radio links between a plurality of base station transceivers and a mobile terminal. The radio links in macrodiversity have a set of common radio link configuration parameters. When a change in the common configuration is necessary, the system transmits a radio link configuration change message to each of the base station transceivers and the mobile terminal and waits before implementation of the radio link configuration change until an acknowledgement has been received from at least one base station transceiver in transmitting communication with the mobile terminal, at least one base station transceiver in receiving communication with the mobile terminal and the mobile terminal.

24 Claims, 8 Drawing Sheets

METHOD AND APPARATUS FOR CHANGING RADIO LINK CONFIGURATIONS IN A MOBILE TELECOMMUNICATIONS SYSTEM WITH SOFT HANDOVER

The present invention relates to a method of operating soft handover (sometimes known as "hand off") or macrodiversity in a cellular or cordless mobile telecommunications system. The present invention also relates to a mobile telecommunications network and a method of operating the same including macrodiversity.

TECHNICAL BACKGROUND

Cellular mobile telephone systems rely on the reuse of radio frequencies in different cells or radio coverage areas. When a mobile terminal moves from communication with a base station in one cell (original base station) to another it is necessary to "handover" the mobile terminal to the base station (target base station) of the new cell. Handovers may be passive or active, i.e. a handover may be necessary when there is no active communication and the mobile terminal is "camped" on the current cell and must be transferred to the new cell (passive handover) or when there is an active communication which must be transferred from the current to the target base station (active handover). In a "soft handover" the mobile terminal communicates with both the old base station and the target base station at the same time and the network may decide, based on certain communication qualities or other criteria, when the signals arriving via the target base station are acceptable and the link to the original base station may be broken.

A method and a system for providing a communication with the mobile terminal through more than one base station during the handover process are disclosed in U.S. Pat. No. 5,625,876. Using this system, a communication between the mobile terminal and the end user is not interrupted by a handoff from the original base station to a target base station. The communication with the target base station is established before communication with the original base station is terminated. When the mobile terminal is in communication with two base stations, a single signal for the end user may be created from the signals from each base station by a cellular or personal communication system controller.

In systems in which a mobile terminal may communicate with several base stations at the same time, e.g. CDMA systems, mobile terminal assisted handoff may operate based on the signal strength of beacon or pilot signals from several sets of base stations as measured by the mobile terminal. An Active Set is the set of base stations through which active communication is established. The Neighbour Set is a set of base stations surrounding an active base station comprising base stations that have a high probability of having a pilot or beacon signal strength of sufficient level to support communication of adequate quality. The Candidate Set is a set of base stations having a pilot or beacon signal strength of sufficient level to establish communication.

When communications are initially established, a mobile terminal communicates through a first base station and the Active Set contains only the first base station. The mobile terminal monitors the pilot or beacon signal strength of the base stations surrounding at and each of these is allocated to the Active Set, the Candidate Set, or the Neighbour Set. When a pilot or beacon signal of a base station in the Neighbour Set exceeds a predetermined threshold level, the base station is added to the Candidate Set and removed from the Neighbour Set of the mobile terminal. The mobile terminal communicates a message to the original base station identifying the new base station. A cellular or personal communication system controller decides whether to establish communication between the new base station and the mobile terminal. Should the cellular or personal communication system controller decide to do so, the cellular or personal communication system controller sends a message to the new base station with identifying information about the mobile terminal and a command to establish communications therewith. A message is also transmitted to the mobile terminal through the original base station. The message identifies a new Active Set that includes the original and the new base stations. The mobile terminal searches for the new base station transmitted information signal and communication is established with the new base station without termination of communication through the original base station. This process can continue with additional base stations.

When the mobile terminal is communicating through multiple base stations, it continues to monitor the signal strength of the base stations of the Active Set, the Candidate Set, and the Neighbour Set. Should the signal strength corresponding to a base station of the Active Set drop below a predetermined period of time, the mobile terminal generates and transmits a message to report the event. The cellular or personal communication system controller receives this message through at least one of the base stations with which the mobile terminal is communicating. The cellular or personal communication system controller may decide to terminate communications through the base station having a weak pilot or beacon signal strength.

The cellular or personal communication system controller upon deciding to terminate communications through a base station generates a message identifying a new Active Set of base stations. The base station through which communication is established sends a message to the mobile terminal. The cellular or personal communication system controller also communicates information to the relevant base station to terminate communications with the mobile terminal. The mobile terminal communications are thus routed only through base stations identified in the new Active Set. In a cellular or personal communication telephone system, maximising the capacity of the system in terms of the number of simultaneous telephone calls that can be handled is also extremely important.

All messaging across the air interface between a mobile terminal and a base station involves complex digital signal processing and certain parameters of the messaging, e.g. types of spreading codes or forward error coding, data rate, bandwidth, frequency, must be known in advance by the mobile terminals and the base stations before successful communication can take place. Hence, the digital transmissions across the radio link have a certain configuration. Any change of the parameters of this radio link configuration must be communicated to the respective transmitters and receivers before the change may be implemented. When a mobile terminal is in soft handover, the radio links to the plurality of base stations have a common configuration. It is necessary to communicate a change of radio link configuration to the mobile terminal and all the base stations involved in the current communication with the mobile terminal. In particular, when the configuration is changed then there is the danger that any network element which does not recognise the change will no longer be able to decode signals after the change. If this network element is the mobile terminal then connection to the mobile is lost and cannot be recovered other than by rapidly reverting to the old configuration. To maintain synchronisation a radio link configuration change message may be sent from the network to each of the current base stations and the mobile terminal giving details of the changes. The new radio link configuration is not applied immediately but after a certain predetermined time. The delay is chosen so that the on average the mobile terminal 7 and the base stations will have sufficient time to reconfigure. Using a fixed delay time has the disadvantage that this time will normally be set conservatively so that reconfiguration will take longer than necessary on average.

It is an object of the present invention is to provide a method and a telecommunications system implementing the method which reduces the time required to reconfigure transmissions across the air interface.

SUMMARY OF THE PRESENT INVENTION

The present invention includes a method of operating a telecommunications system in which mobile terminals may communicate with base station transceivers over an air interface, a communication to another user terminal being supported in macrodiversity by radio links between a plurality of base station transceivers and a mobile terminal, the radio links having a common configuration of transmission parameters, the method comprising the steps of: transmitting a radio link configuration change message to each of the base station transceivers and the mobile terminal; and waiting before implementation of the radio link configuration change until an acknowledgement has been received from at least one base station transceiver in transmitting communication with the mobile terminal, at least one base station transceiver in receiving communication with the mobile terminal and the mobile terminal.

The present invention also includes a telecommunication system in which mobile terminals communicate with base station transceivers over an air interface, a communication between a mobile terminal in macrodiversity and another user terminal being connected by radio links to a plurality of base station transceivers, the radio links having a common configuration of transmission parameters, the system comprising:

a network element adapted for transmitting a change in radio link configuration message to the plurality of base station transceivers and the mobile terminal, and for waiting before application of the change in configuration for an acknowledgement of the receipt of the change message from at least one the base station transceiver in transmitting communication with the mobile terminal, at least one base station transceiver in receiving communication with the mobile terminal and the mobile terminal.

The present invention also includes a network element for use in a telecommunication system in which mobile terminals communicate with base station transceivers over an air interface, a communication between a mobile terminal in macrodiversity and another user terminal being connected by radio links to a plurality of base station transceivers, the radio links having a common configuration of transmission parameters, the network element being adapted for transmitting a change in radio link configuration message to the plurality of base station transceivers and the mobile terminal, and for waiting before application of the change in configuration for an acknowledgement of the receipt of the change message from at least one the base station transceiver in transmitting communication with the mobile terminal, at least one base station transceiver in receiving communication with the mobile terminal and the mobile terminal.

The present invention includes a method of operating network element in a telecommunications system in which mobile terminals may communicate with base station transceivers over an air interface, a communication to another user terminal being supported in macrodiversity by radio links between a plurality of base station transceivers and a mobile terminal, the radio links having a common configuration of transmission parameters, the method comprising the steps of: transmitting from the network element a radio link configuration change message to each of the base station transceivers and the mobile terminal; and waiting before applying the radio link configuration change until an acknowledgement has been received from at least one base station transceiver in transmitting communication with the mobile terminal, at least one base station transceiver in receiving communication with the mobile terminal and the mobile terminal.

The present invention includes waiting until confirmations have been received from only those base stations which provide a minimum quality of service, e.g. bit error rate, signal strength, frame error rate.

Macro-diversity includes soft handover. Soft handover also includes so-called softer handover in which the transmitters are at one site. The common radio link configuration is particularly related to the configuration of dedicated transport channels, i.e. those channels in the downlink and uplink directions used to carry user information or control information related to the transport of this information between the base stations and the mobile terminal on channels which have been dedicated to that link. Dedicated channels should be differentiated from common transport channels such as required for paging, common random access, broadcasting information to mobiles in general, e.g. pilot signals.

The dependent claims define individual further embodiments of the present invention.

The present invention will now be described with reference to the following drawings.

DESCRIPTION OF THE ILLUSTRATIVE EMBODIMENTS

The present invention will be described with a reference to certain embodiments and drawings but it is not limited thereto but only by the claims. Further, the present invention will mainly be described with reference to cellular mobile telecommunication systems, but the present invention is not limited thereto and may be applied to any mobile telecommunication system, e.g. a cordless telecommunication system such as DECT, which routes messages through a network to base stations transceivers and allows communication between a single mobile terminal and several base station transceivers simultaneously. In addition, the term soft handover is intended to describe a situation where one mobile terminal may communicate simultaneously with several base station transceivers for the same communication—often called downlink macro-diversity. The present invention is not limited to all the base stations of the system being synchronised. Also asynchronous operation is included. Where base stations in soft handover are not synchronised the mobile terminal receiver determines the time difference for each base station and decodes each transmission in accordance with this time difference.

Figure 1:
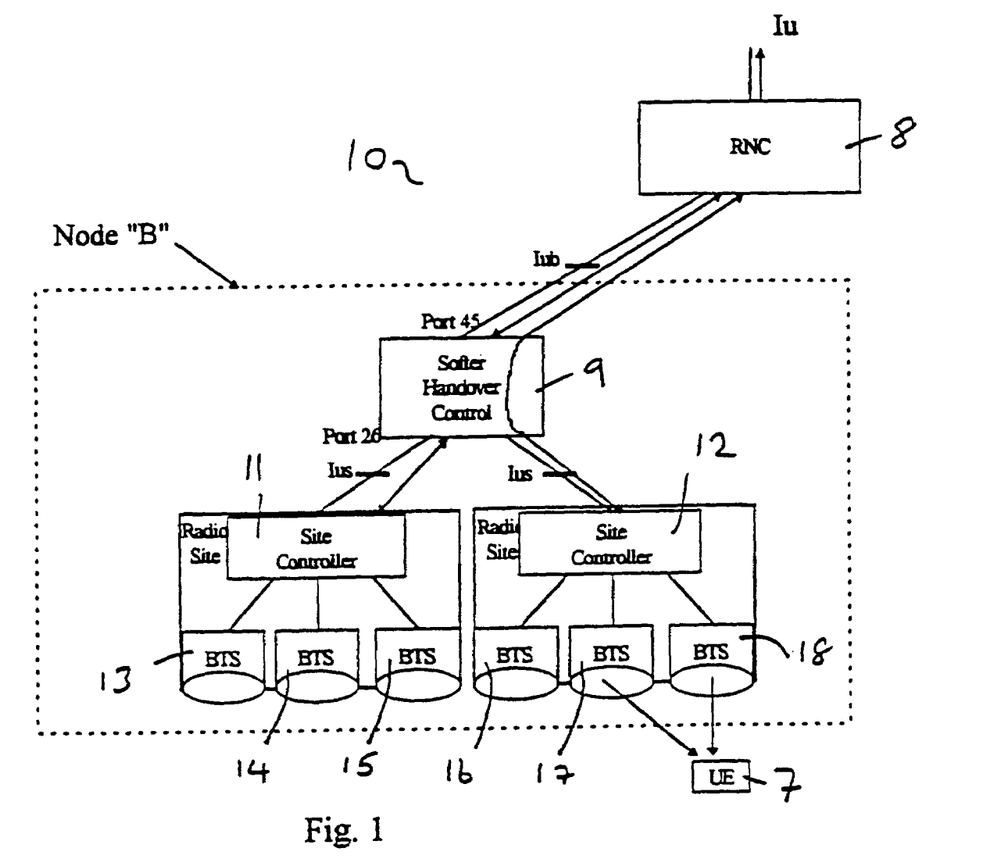
FIG. 1 is a schematic representation of a telecommunications network in accordance with a first embodiment of the present invention.

A first embodiment of the present invention will be described with reference to FIG. 1 and includes a mobile telecommunications network 10 in which a mobile terminal 7 may communicate with one or more base stations 13 to 18 simultaneously via radio links on a radio air interface. As an example, the communication system 10 may use a spread spectrum access method for the mobile terminals 7, e.g. a CDMA, an FDMA/CDMA, a TDMA/CDMA, or an FDMA/TDMA/CDMA system or similar, in particular, any system using direct sequence spread spectrum techniques. In particular, the network may be a wide-band spread spectrum system. A wide band system typically has a channel bandwidth of 5 MHz or above. Further, network 10 may be part of a Generic Radio Access Network (GRAN), i.e. network 10 may be linked to one or more core networks which may include alternative mobile telephone networks and/or landline networks. Hence, network 10 may provide an access network for mobile telecommunication as well as a standardised interface $I_U$ to other core networks which need not be defined at the time of implementation of the GRAN. CDMA, GRAN and wide-band mobile telecommunications systems are described in the book "Wide band CDMA for third generation mobile communications", editors Tero Ojanperä and Ramjee Prasad, Artech House Publishers, 1998 which is incorporated herein by reference.

Typically, each base station 13–18 will transmit a beacon or pilot signal which can be processed by any mobile terminal 7. In an exemplary CDMA system, each base station 13–18 transmits a pilot signal having a common PN spreading code that is offset in code phase from the pilot signal of other base stations. During system operation, a mobile terminal 7 is provided with a list of code phase offsets corresponding to neighbouring base stations 13–16, 18 surrounding the base station 17 through which a communication is currently established. The mobile terminal 7 is equipped with a searching element that allows the mobile terminal 7 to track the signal strength of the pilot signal from a group of base stations 13–18 including the neighbouring base stations. The pilot signal will be typically used by a mobile terminal 7 for initial synchronisation.

Each group of base stations 13–15; 16–18 may be controlled by a site controller 11; 12. Each triplet of base stations 13–15; 16–18 may serve the three sectors of one radio site. Each site controller 11, 12 communicates with a network controller RNC 8 which in turn may be connected to other RNC's and other switches within the network as well as to other networks such as a pubic telephone network (PSTN). The protocols used for communicating between the RNC 8, the site controllers 11, 12 and other switches in the networks are not considered to be a limitation on the present invention and may be, for example, an IP, and IP/TCP, an ATM protocol or any other suitable protocol. A softer handover controller (SHC) 9 which is associated with one or more site controllers 11, 12 may be provided for combining signals from several base stations 13–18 to improve overall reception. Alternatively, soft handover control may be carried out by other network elements. Preferably, handover procedures are not carried out by core networks communicating with network 10 via the interface $I_U$ so that all handovers are controlled within the network 10. The functions of locally controlling the base stations 13–18 will be described as being located within a network component "node B" without specifying exactly how these functions are mapped to individual elements thereof.

Figure 2:
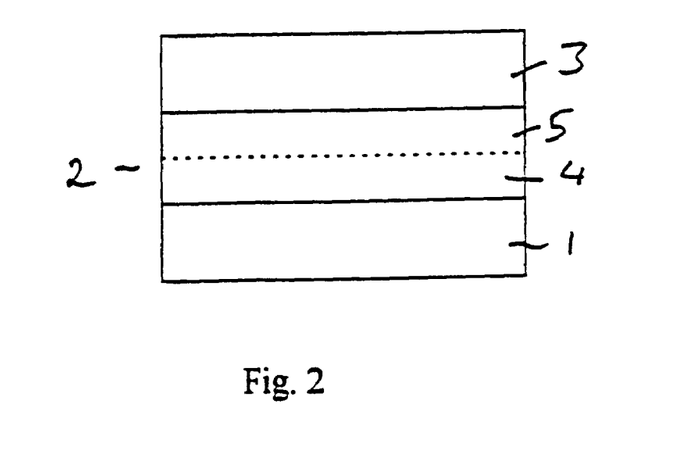
FIG. 2 is a protocol layer structure for the system of FIG. 1.

As shown in FIG. 2 the functions of the radio air interface between mobile terminal 7 and a base station 13–15; 16–18 of a mobile radio telecommunications system such as 10 may be structured in protocol layers. The physical layer 1 is the lowest layer and supports all functions required for bit streams of data transmitted over the physical air medium. The physical layer 1 provides data transport services to higher layers 2, 3 and should not restrict the operation of these layers. The link layer 2 may be divided into two sub-layers, the medium access control 4 (MAC) and the link access layer (LAC) 5. The MAC 4 co-ordinates the resources offered by the physical layer 1. The LAC 5 performs functions required for set-up, maintenance and release of a communication link connection. The network layer 3 includes call control, mobility management and radio resource management functions. In particular, the network layer 3 controls the configuration of the physical layer 1 by means of signalling sent to those network elements such as mobile terminals, site controllers and base stations which are involved in transmitting and receiving the bit stream.

The logical channels used for transmission across the air interface may be divided into control channels and transport channels. Control channels may be common channels which are point-to-multi-point channels or dedicated control channels which are usually point-to-point bi-directional channels. Transport channels are usually dedicated point-to-point channels. In cases of soft handover or macro-diversity, both dedicated control and transport channels may also be point-to multi-point whereby the numbers of base stations involved in the communication is that sub-set of the base stations of the system which is in communication with a single mobile terminal. Logical channels are mapped into physical channels whereby a specific function of a logical channel may be mapped into several physical channels or several logical channels may be mapped into a single physical channel. Within the physical layer 1, forward error coding/decoding and error detection, measurements, multiplexing and demultiplexing of traffic channels, macrodiversity distribution/combining and soft handover execution, mapping of coded traffic channels on physical channels, modulation and spectrum spreading/demodulation and despreading of physical channels, frequency and timing (chip, bit, slot, frame) synchronisation, closed-loop power control, power weighting and combining of physical channels, radio frequency processing may be performed on the data transmitted on a physical radio channel.

User messages are transmitted on dedicated transport channels across the air interface, i.e. on channels dedicated for transmissions between a particular mobile terminal and one or more base stations 17, 18 (soft handover, often called macro-diversity). Dedicated channels should be distinguished from common channels used for general communication purposes with a plurality of mobile terminals, e.g. paging channels, common random access channels, broadcasting channels. Messaging across the air interface on dedicated channels involves complex digital signal processing which is defined by certain parameters, e.g. types of spreading codes or forward error coding, data rate, bandwidth, frequency, encryption method and/or change of encryption keys, and these must be known to the mobile terminal 7 and the base stations 17, 18 in advance before successful communication can take place. Hence, the digital transmissions across the air interface on dedicated channels have a certain common radio link configuration which is a complete specification of these parameters. Note that power control is performed between each base station and the mobile terminal independently so that power control does not belong to a common configuration of all base stations involved in the macro-diversity. Any change of the parameters of this common configuration must be communicated to the respective transmitters and receivers involved in the communication before the change may be implemented. When a mobile terminal 7 is in soft handover there is a common radio configuration of the radio links between the different base station 17, 18 and the mobile terminal 7. Hence, it is preferably to communicate a change of configuration to the mobile terminal 7 and all the base stations 17, 18 involved in the current communication with the mobile terminal 7 before a configuration change can take place.

There are many ways of specifying the configuration of a radio link all of which are included within the scope of the present invention. In the following one non-limiting way will be described in order to illustrate the present invention. The MAC 4 (of layer 2) is responsible for mapping data onto the physical layer 1. A transport block is the basic unit which is exchanged between the physical layer 1 and the MAC 4. For transmission on the physical layer 1 cyclic redundancy check bits and/or parity bits may be added to a transport block. The transport block size is defined by the number of bits in that block. A transport block set is a set of transport blocks which are exchanged between the physical layer 1 and the MAC 4 at the same time using the same traffic channel. The transmission time interval for is the inter-arrival time of transport block set, i.e. the periodicity at which a transport block set is transferred by the physical layer 1. The transport format is the format offered by the physical layer 1 for the delivery of a transport block during the transmission time interval on a traffic channel. The transport format may include two parts: the dynamic part and the semi-static part. The dynamic part may include, for instance, information defining transport block size, transport block set size and transmission time interval. The semi-static part may include information defining transmission time interval, type of channel coding, e.g. type and/or use/non-use of outer coding, outer interleaving (depth of the outer interleaving in radio frames), type and/or use of inner coding, inner interleaving (depth of the inner interleaving in radio frames), rate matching. A transport channel may support several formats, e.g. for voice, for voice and data, for data alone, for video, etc. A transport format set is the set of transport formats which are associated with a transport channel. The semi-static parts of all transport formats are preferably the same within a transport format set. Physical layer 1 multiplexes one or more transport channels and for each transport channel there exists a list of currently applicable transport formats which form the transport format set. However, at any one moment in time not all of these possible formats will be used. Instead a current sub-set of these will be used which form the transport format combination, i.e. the authorised combination of currently valid transport formats which can be submitted simultaneously to the physical layer 1.

In order to reduce the amount of signalling information which has to be transmitted it is preferable to refer to transport formats and transport format combinations by abbreviations or indicators. An indicator is a label which corresponds to an agreed format. For instance, a transport format indicator TFI is a label for a specific transport format within a transport format set. It may be used in inter-layer signalling between the MAC 4 and the physical layer 1 each time a transport block set is exchanged between the two layers on a transport channel. The TFI provides the information to a receiver of which format should be used for processing the attached transport block. A transport format combination indicator TFCI is a representation of the combination of currently valid transport formats. There is a one-to-one correspondence between a certain value of the TFCI and a certain transport format combination. The TFCI is used in order to inform a receiver of the currently valid transport formats which the receiver may expect to receive and hence provides information of how to interpret the TFI's in received data so that it can be decoded, de-multiplexed and delivered on the appropriate transport channels. The MAC 4 indicates the TFI to the physical layer 1 at each delivery of transport blocks sets on each transport channel. The network-side of layer 1 then builds the TFCI from all the TFI's of all parallel transport channels to the mobile terminal, processes the blocks accordingly and appends the TFCI to the physical layer control signalling. The receiver obtains details of the transport format combination from the TFCI so as to be able to process the data using the relevant TFI supplied with each block (set).

Occasionally it is necessary to reconfigure the meaning of the TFCI. At initialisation of the system the values of the TFCI are set. Once operating, any reconfiguration of the meaning of the TFCI which involves replacement of one meaning with another, e.g. the TFI presently used for video is to represent half-rate voice transmissions in the future, requires synchronisation between the network 10 and the mobile terminals regarding when the new configuration comes into effect. In particular, when the meanings of the TFCI are changed by replacement then there is the danger that any network element which does not recognise the change will no longer be able to decode certain signals correctly after the change. If this network element is the mobile terminal then connection to the mobile may be lost and cannot be recovered other than by rapidly reverting to the old configuration. To carry out the format change procedure, the relevant elements of the network (in accordance with the present invention mobile terminals are considered to be network elements) must be able to change configuration at the right moment.

One suitable method of providing this co-ordination of the network elements will be described with reference to FIGS. 3A, B and C, 4 and 5. In accordance with a first embodiment of the present invention when a radio link configuration is to be changed a radio link configuration change message (RLCCM) is sent from the network 10 giving details of the changes in meanings of the TFCI to each of the base stations 17, 18 and the mobile terminal 7 involved in a current communication with macrodiversity, e.g. soft handover. In accordance with the present invention, the new configuration is not applied until at least one of the base stations 17, 18 involved in transmission to mobile terminal 7 in the current communication and at least one of the base stations 17, 18 involved in reception in the current communication as well as the mobile terminal 7 have each acknowledged readiness to implement the new configuration. Generally, the base stations which provide confirmations will be listed in the Active Set. However, of these base stations one or more may have inferior transmission or reception properties. In accordance with one embodiment of the present invention the requirement for the sufficient receipt of confirmations before application of the new configuration includes accepting confirmations from only those base stations of the Active Set which provide a minimum quality of service (QOS). The level of QOS may be determined by a variety of tests on the transmissions over the radio interface, e.g. bit error rate, received signal strength, frame error rate.

Figure 3A:
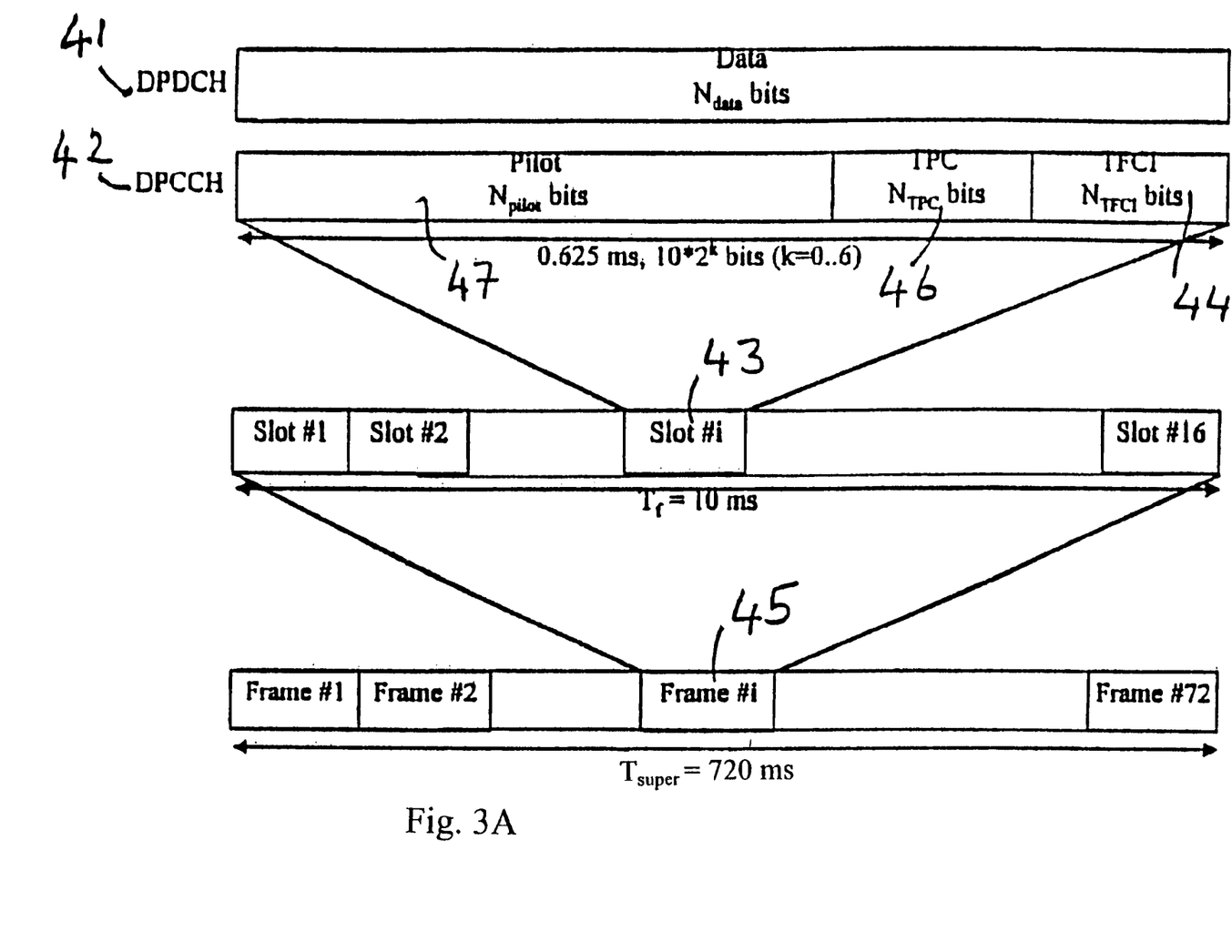
FIG. 3A is a representation of separate dedicated channels for traffic data and control data in accordance with an embodiment of the present invention.
Figure 3B:
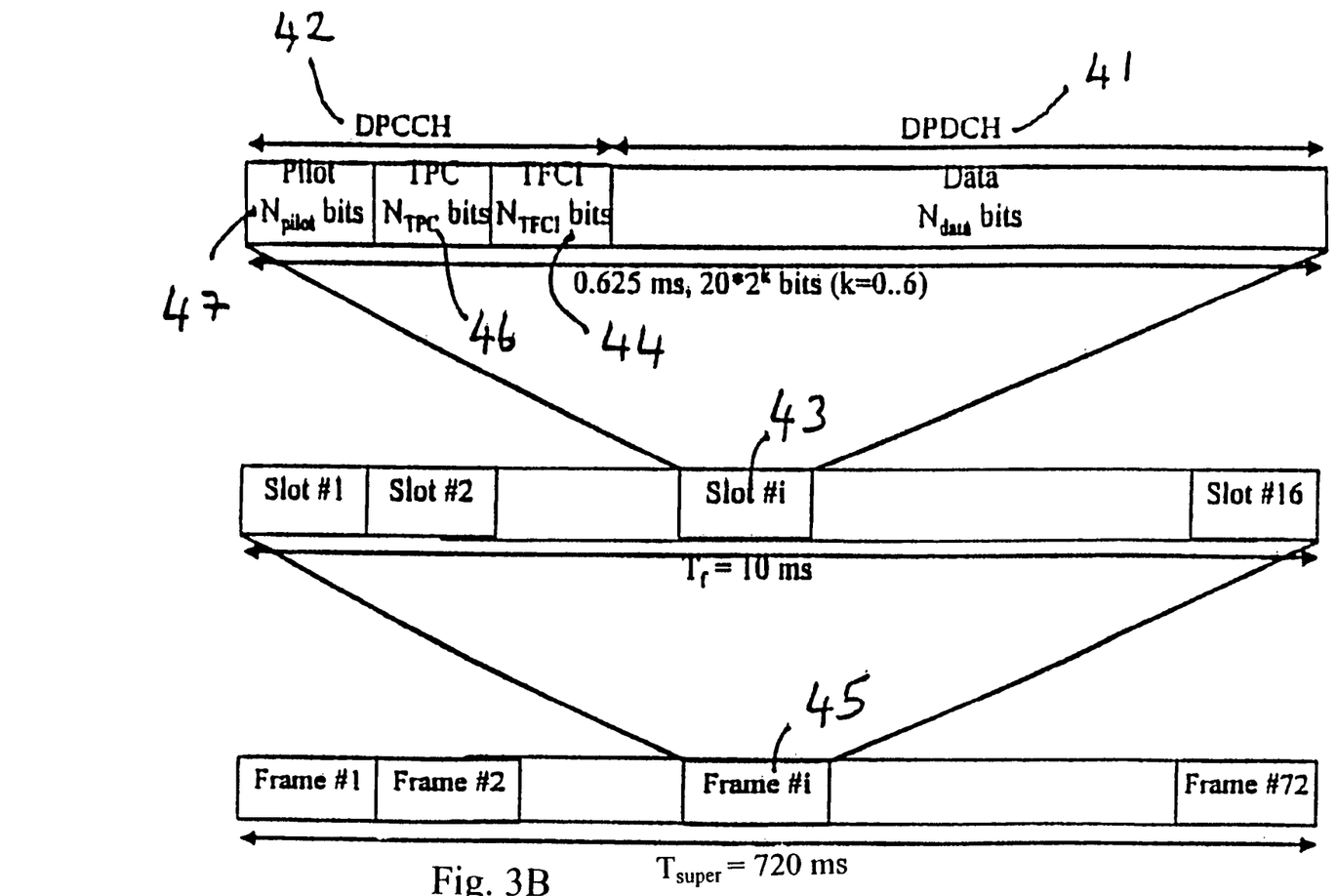
FIG. 3B is a representation of a dedicated channel with multiplexed traffic data and control data in accordance with an embodiment of the present invention.
Figure 3C:
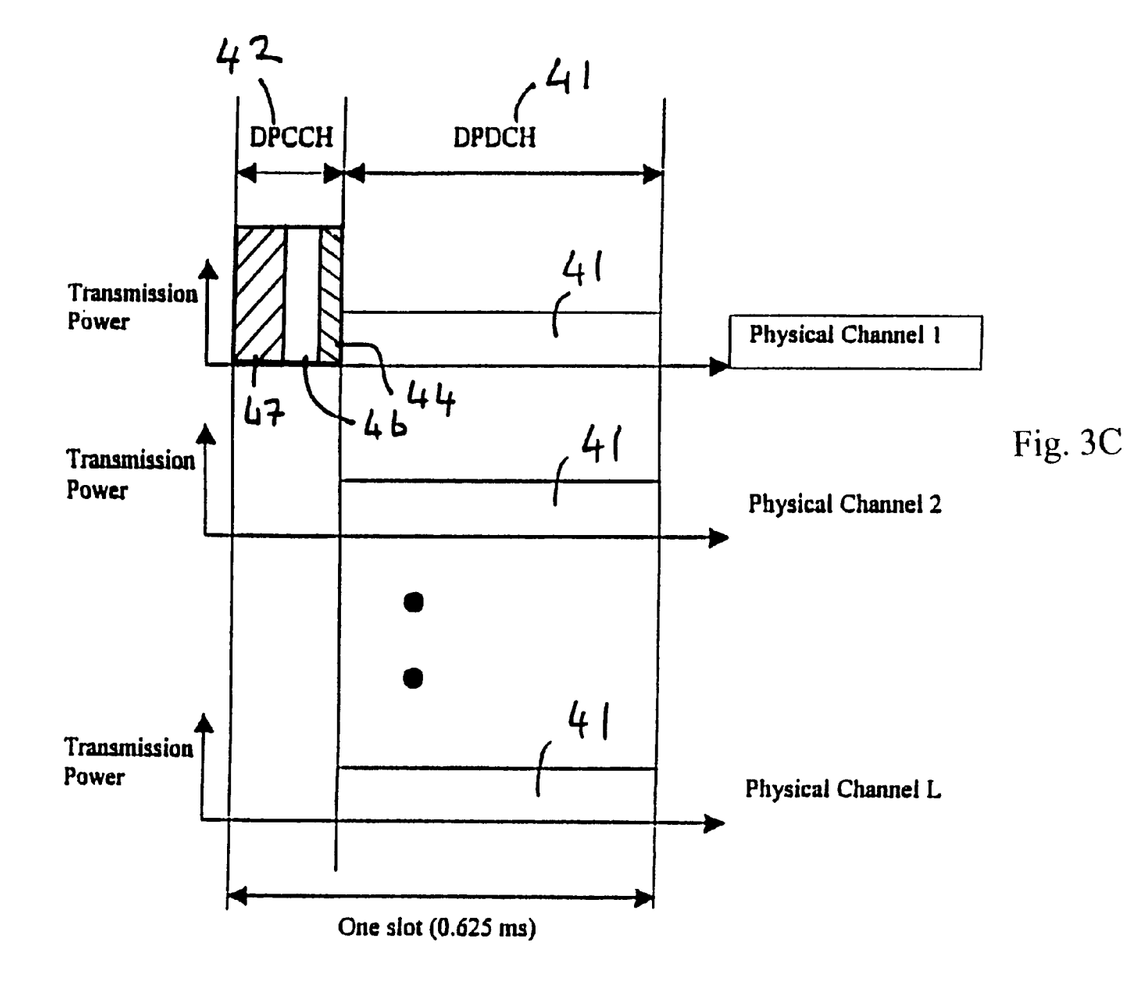
FIG. 3C is a representation of control data channels and traffic data channels in the case when a plurality of dedicated traffic channels are used in accordance with an embodiment of the present invention.

FIG. 3A is a schematic representation of an uplink dedicated physical control channel 42 (DPCCH) and a dedicated data (traffic channel) 41 (DPDCH). The DPDCH 41 is used to carry user information whereas the DPCCH 42 carries control information between the network 10 and a mobile terminal 7. In a CDMA-TDMA system, each slot 43 of DPCCH 42 includes the TFCI 44 which defines the currently valid combination of parameters of the dedicated radio link for the receiving mobile 7. A plurality of slots may be included in a frame 45. Alternatively, in a conventional CDMA system, the DPCCH channel is sub-divided into frames (not shown). Before receipt of the first frame from the RNC 8 which includes a TFCI 44 having amended meanings, the receiver of the mobile terminal 7 must have been previously configured to accept the new TFCI meanings and must also be aware when this change takes place. Only then can the mobile terminal 7 decode subsequent transmissions from the base stations 17, 18 correctly. Methods of achieving this will be described below. The DPCCH 42 may include other optional control information such as transmit power control (TPC) commands 46 and dedicated pilot bits 47 for use with adaptive antennae.

In accordance with the present invention the network 20, e.g. the RNC 8 waits until confirmations of readiness to apply the new configuration have been received from a sufficient number of network elements before applying the change in configuration. A sufficient number of network elements includes the mobile terminal 7, a base station involved in transmission to the mobile terminal 7 and a base station involved in reception from the mobile terminal 7. The base for transmission may be the same as the base station for reception. Generally, the base stations involved will be in the Active Set for the mobile terminal 7. The present invention also includes waiting until confirmations from those base stations which provide a minimum QOS have been received. By waiting until all these network elements have confirmed, loss of contact with the mobile terminal 7 either in transmission or reception after a configuration change is avoided. If no or too few confirmations are received by the RNC 8, an alternative procedure may be carried out, e.g. a further RLCCM is transmitted, or the procedure may be aborted or the configuration change may be implemented after awaiting a specified time independent of receipt of confirmations.

Once a sufficient number of confirmations have been received, the network, e.g. RNC 8, transmits a configuration apply message. When the mobile terminal 7 receives the configuration apply message from the network, e.g. RNC 8, it begins operating to the revised TFCI 44 in a subsequent transmit slot 43. This change of TFCI 44 is detected by the base stations 17, 18, site controller 11 and softer handover controller 9 by a method as described below and these network elements process the attached data channel 41 with the new configuration. Detection of a change to a new TFCI 44 at RNC 8 triggers the transmission of the downlink apply message. This is detected by the network elements base stations 17, 18, site controller 11, softer handover controller 9 and mobile terminal 7 by a method as described below and these network elements change their configurations accordingly.

The present invention is not limited to separate dedicated traffic data and control data channels as described above. The traffic data may be multiplexed with the control data on a single physical channel. An example of multiplexed transmission is shown schematically in FIG. 3B for a downlink dedicated channel. In this case each slot includes the DPCCH control information multiplexed with the traffic data DPDCH. If the receiver is to process the DPDCH data using the new configuration parameters, then the DPCCH information is preferably placed before the traffic data DPDCH. The present invention includes using multiplexed control and traffic data on a dedicated channel in one direction, e.g. downlink, with separate traffic data and control data dedicated channels in the uplink. Further, the present invention also includes transmitting the control and/or traffic data over several parallel dedicated channels. Ideally these parallel channels should be multicoded, i.e. distinguished by spreading codes, but using one spreading factor. In order to make sure that in this case the TFI 44 reaches the receiver before any data which has to be processed in accordance with the revised format, the TFI may be sent in a separate transmission before parallel transmission begins. This is shown schematically in FIG. 3C.

Figure 4:
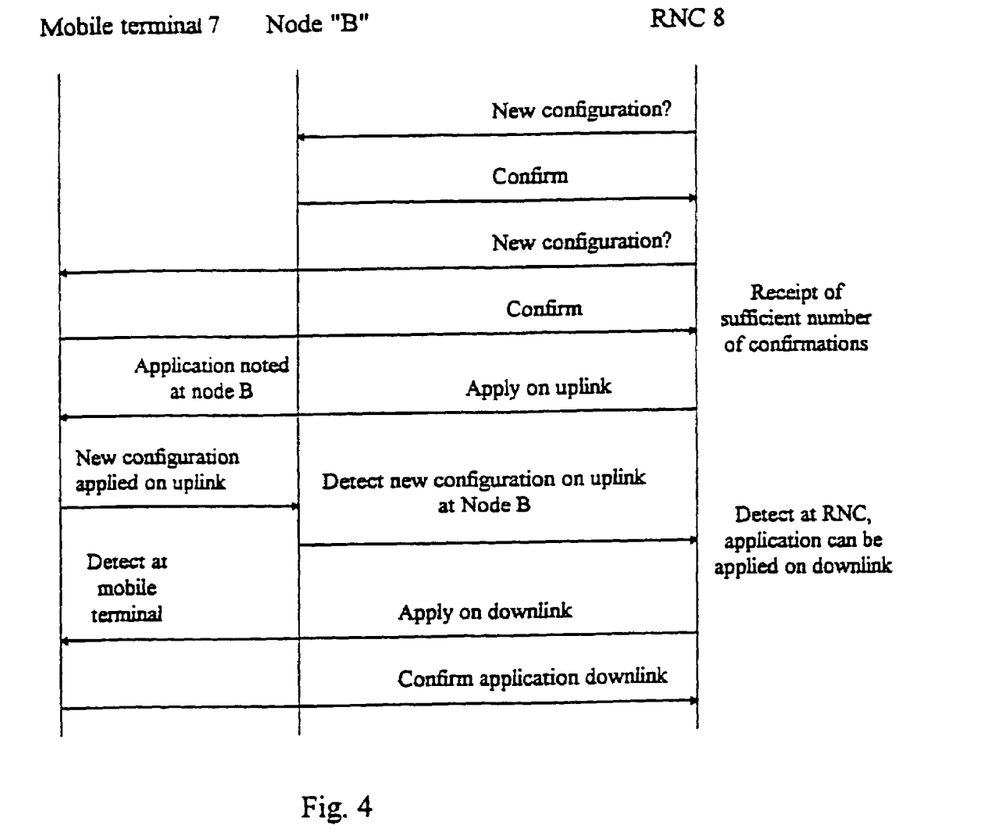
FIG. 4 is a message sequence in accordance with the first embodiment of the present invention.

A message sequence in accordance with the first embodiment is shown schematically in FIG. 4. A network element transmits the RLCCM to each of the base stations 17, 18 via "node B". The network element in this case is the RNC 8 and the RLCCM is transmitted via the optional softer handover controller 9 and site controller 12. After one or more of the base stations 17, 18 has acknowledged confirmation of the new configuration to node B, a confirmation is sent to the RNC 8 from node B confirming readiness to make the configuration change. The confirmation from node B may be delayed until confirmations have been received from base stations with an adequate QOS. RNC 8 also sends an RLCCM to mobile terminal 7 via node B, i.e. via softer handover controller 9, site controller 12 and base stations 17, 18. This RLCCM may be sent on common signalling channels or may be sent on the dedicated channels to the mobile terminal 7 by combining downlink messages with the RLCCM. Methods of combining signalling with traffic messages are described in U.S. Pat. No. 5,550,773. Alternatively, the RLCCM may be punctured into the dedicated channel. The confirmation message from the mobile terminal 7 may be combined, for example, with uplink user traffic on the dedicated channel, punctured into the dedicated channel or sent via common signalling channels. On receipt of a confirmation messages from the mobile terminal 7 and one or more of the base stations 17, 18 the RNC 8 initiates the change of configuration on the uplink. The RNC 8 transmits an uplink new configuration apply message to the mobile terminal 7 via node B, i.e. the network elements softer handover controller 9, site controller 12 and base stations 17, 18. These elements of node B note the implementation of the change of configuration. This first noting of the change is important as these network components are advised in advance of the change and can prepare themselves for the change. The nature of the radio interface is such that high error rates may be expected from time-to-time. For further steps in the procedure in accordance with the present invention protocols are preferably implemented which allow for the fact that a mobile terminal 7 may not always receive a command correctly. Hence, the protocols should be designed so that they accommodate receipt of faulty commands or of failing to receive a command without catastrophic loss of the communication.

On receipt of the uplink apply message from the network 10, the mobile terminal 7 changes its transmit parameters to transmit the user messages on the dedicated channel with the new configuration and begins transmissions on the dedicated uplink channel with the new configuration. In accordance with one embodiment of the present invention this change may be detected by the network elements, e.g. base stations 17, 18, site controller 12, softer handover controller 9 and the RNC 8 by a specific message or indication in transmissions from the mobile terminal 7, however, the present invention is not limited thereto. The relevant network elements 9, 12, 17, 18 involved in the current communication may implement the change based on the first noting mentioned above. For instance, each relevant network element 9, 12, 17, 18 may implement the change in transport format a certain time after the first noting with respect to data received from the mobile terminal 7, e.g. after a predetermined delay. If the result of using the new format for decoding the received data is meaningless, for instance, has a very high number of errors whereas the decoding with the old format is better, the format may be automatically changed back to the old format based on the assumption that the mobile terminal 7 has not reacted to the apply message for some reason. As an alternative, the relevant network elements 9, 12, 17, 18 may perform dual decoding, i.e. they may for a predetermined time decode according to the old format and in accordance with the new format and compare the results of the two decodings, e.g. with respect to error rates. Due to the fact that dual decoding takes up additional resources it is preferable if the decoding phase is limited in time after which a decision is made as to which transport format will be used.

In accordance with the embodiment of the present invention in which the application of the uplink change in transport format is detected by the relevant network elements 9, 12, 17, 18 from the transmission from the mobile terminal 7, the detection may be direct or indirect. By direct is meant that a specific symbol or data sequence is used in messaging from the mobile terminal 7 to identify when a change has occurred. This is preferably placed in a portion of a message which precedes data coded in accordance with the changed format. Preferably, the change indicator can be decoded by any of the network elements 9, 12, 17, 18 without knowing the currently correct transport format, i.e. the change indication must be neutral.

By indirect detection is meant some change in the signals received from the mobile terminal 7 from which it can be deduced that a change has occurred. An indirect detection may be a layer 1 detection, i.e. the detection is based on measurements of the layer 1 transmission without requiring analysis of the layer 2 messaging. Hence, in indirect detection, there is no requirement that a specific sequence of bits is transmitted, detection may be by amendment of a property of the transmissions from the mobile terminal 7. In accordance with one embodiment of the present invention a binary property of the transmission is used to signal the change, e.g. the polarity of error detection coding may be used to signal or indicate the change. The principles of error detection coding will be described with reference to FIG. 5. To each byte and/or frame of a transmission a number of extra bits are added whose values are determined from the data to be transmitted in accordance with an algorithm. Various algorithms are known to the skilled person such as check-sum or cyclic redundancy coding, the exact algorithm used is not expected to limit the present invention in any way. In the decoder in the receiver, these extra bits are stripped off and forwarded to two comparators 21 and 23. The remaining part of the bit stream is sent to a decoder 25 which performs the same error detection coding algorithm. The output from the decoder 25 is a bit or a set of bits whose values should match the transmitted error detection bits, i.e. the result of the comparison in the comparators 21 and 23 should indicate coincidence between the error detection bits calculated from the received data and the bits transmitted with the message. The decoder 25 is configured to provide two outputs 27, 29, the output 29 being the binary inverse of the output 27. Similarly, the encoder in mobile terminal 7 is configured to provide one of two outputs, either normal or inverse. To signal a change in format, the encoder in the mobile terminal 7 changes from normal or inverse operation or vice versa. This will be detected in the receiver of the base station by the coincidence between received bits and decoded bits transferring from one comparator 21 to the other comparator 23 or vice versa. This change may be detected in a detector 31 which detects the change of polarity in the outputs from the comparators 21, 23 and the output 33 from the detector may be used to signal the change of transport format to the receiver.

Figure 5:
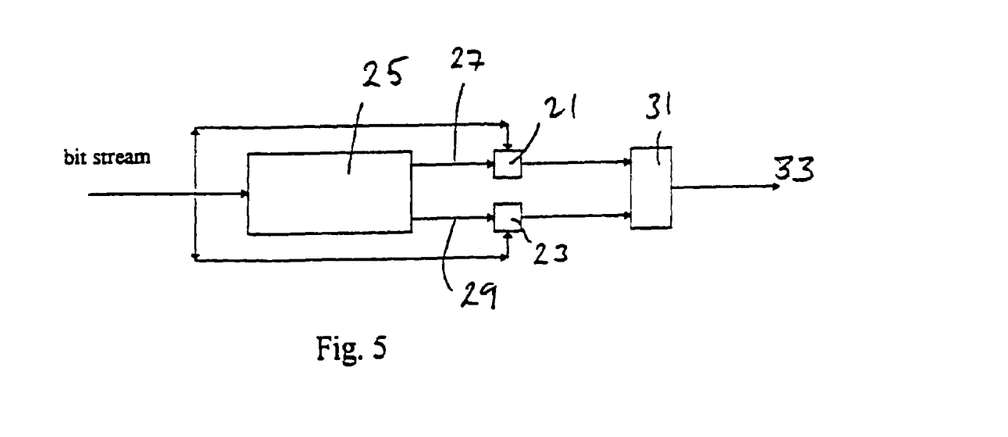
FIG. 5 is a schematic representation of an error detection circuit in accordance with an embodiment of the present invention.

On receipt of one or more indications of the change of uplink configuration from mobile terminal 7, which may be detected by one of the methods described above, that is either by direct or indirect indication of the change, the RNC 8 applies the new configuration in the downlink. The change in the downlink transport format can be detected by the relevant network elements 7, 9, 12, 17, 18 by one of the methods described above, that is either by direct or indirect indication of the change. On detection of this message by the mobile terminal 7, the mobile terminal 7 changes its receiver parameters to the new configuration and sends an apply confirm message to the RNC 8.

Figure 6A:
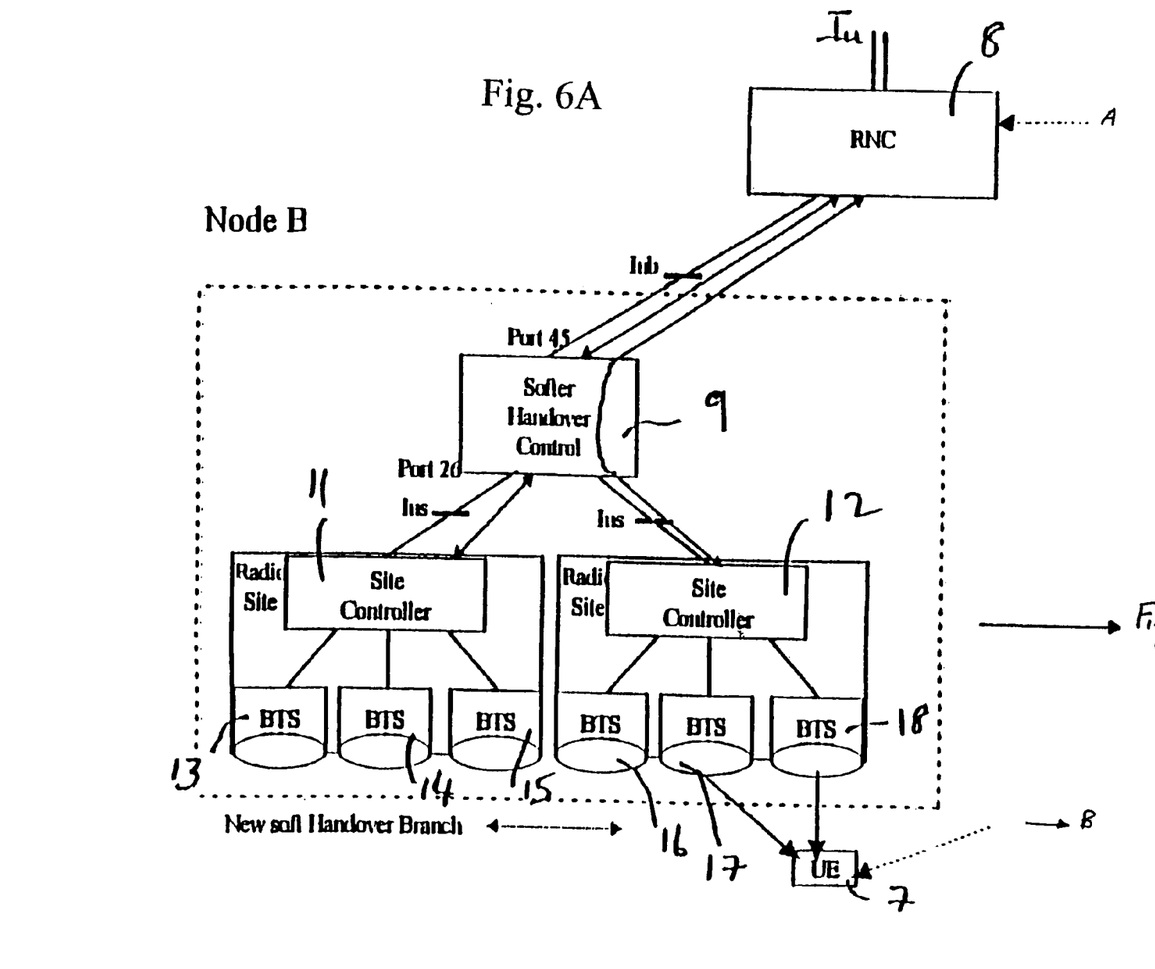
FIG. 6 is a schematic representation of a network in accordance with a second embodiment of the present invention.
Figure 6B:
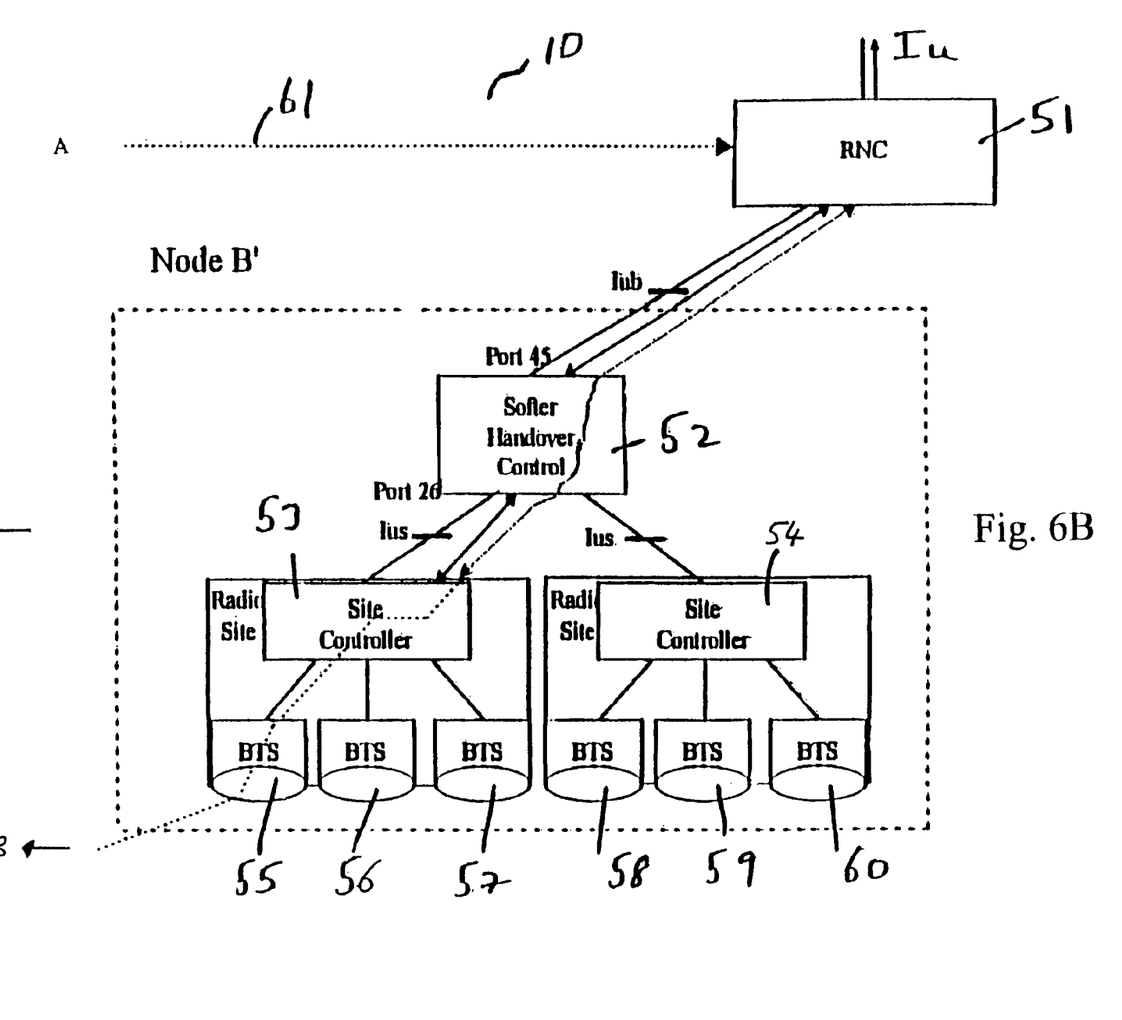

A mobile terminal 7 may be communicating simultaneously in soft handover with two base stations 18, 55 which are served by different RNC's 8, 51 as shown schematically in FIG. 6. For instance, one node of the network 10 may be designated as an anchor node during all handovers and remains as the anchor node of the communication path both before and after the (soft) handover. Typically, one type of node, for example, an RNC 8 will be assigned the duties of the anchor node for handovers. Whichever network element is chosen for this role, it is preferable if each such element can communicate with each other element within the network. For instance, as shown in FIG. 6, the anchor node may be the anchor RNC 8. Let us assume that the mobile terminal 7 is currently in communication with base stations 17, 18 and has decided to create a new radio link to base station 55 while keeping the existing communication links (soft handover). The RNC 8 being the anchor RNC sets up a communication between itself and the RNC 51 (a drift RNC or DRNC) along a communication path 61 which directly connects the two RNC's 8, 51 while maintaining the existing communications to base stations 17, 18. A new link is then set up with the target base station 55 using a new path via the RNC 51, soft handover controller 52, site controller 53 to the target base station 55. The RNC 51 acts as a slave node of RNC 8 as far as communications with respect to and from mobile terminal 7 are concerned. This means that for these transmissions RNC 51 receives commands from RNC 8.

Figure 7:
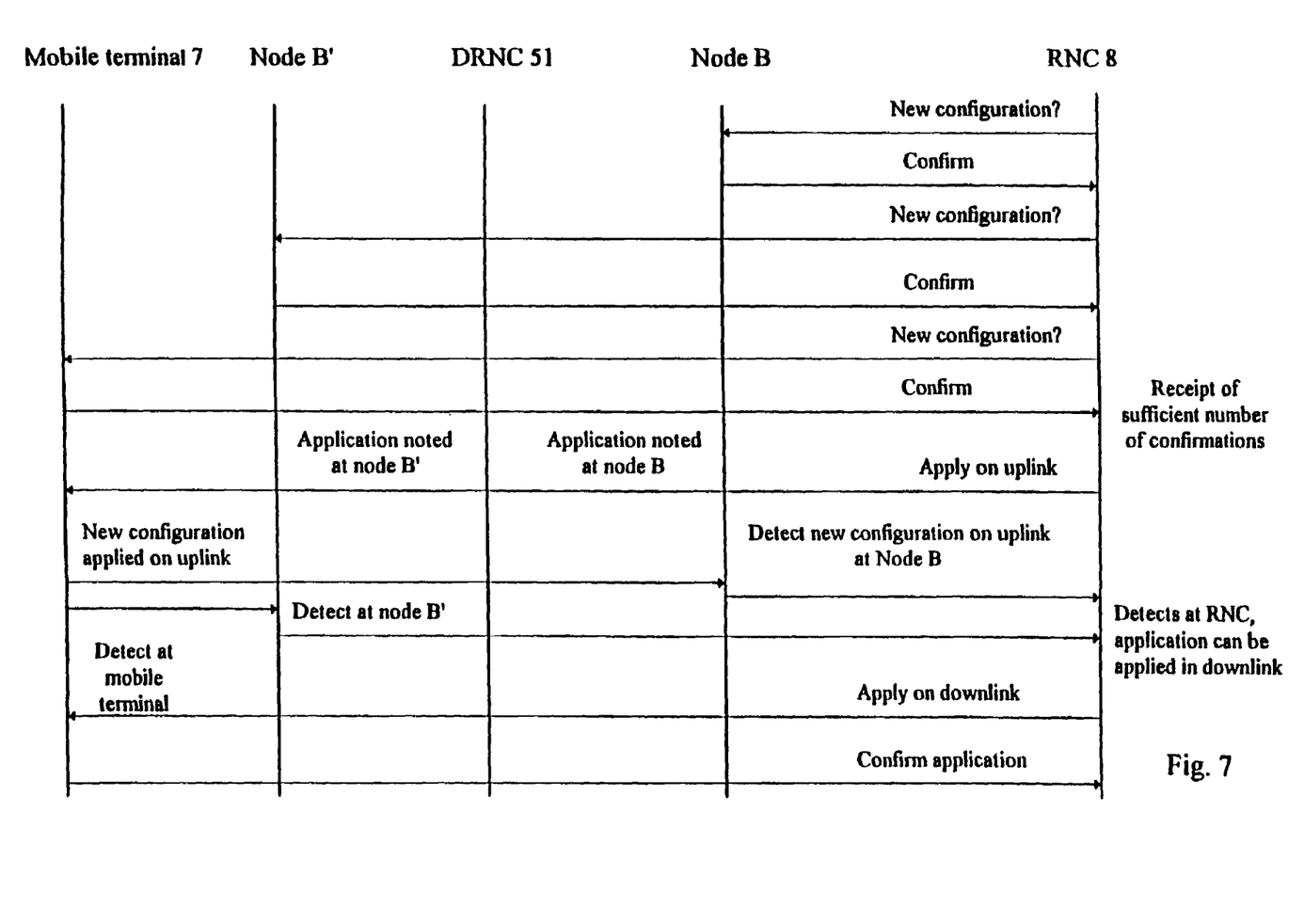
FIG. 7 is a message sequence in accordance with the second embodiment of the present invention.

A message sequence in accordance with a second embodiment of the present invention will be described with reference to FIG. 7. A network element transmits the RLCCM to each of the base stations 17, 18, 55. The network element in this case is the RNC 8. The RLCCM to base stations 17, 18 is transmitted via node B, i.e. softer handover controller 9 and site controller 12 as has been described for the first embodiment. For base station 55, the RLCCM is passed via slave RNC 51 and node B', i.e. softer handover controller 52 and site controller 53. After one or more base stations 17, 18, 55 has acknowledged confirmation of the new configuration to node B and/or node B' respectively, a confirmation is sent to the RNC 8 from node B and/or node B' confirming readiness to make the configuration change. RNC 8 also sends an RLCCM to mobile terminal 7 via the two routes, for example via Node B, i.e. softer handover controller 9, site controller 12 and base stations 17, 18; and via RNC 51 and Node B', i.e. softer handover controller 52, site controller 53 and base station 55. This RLCCM may be sent on common signalling channels or may be sent on the dedicated channels to the mobile terminal 7 by combining downlink messages with the RLCCM. Alternatively, the RLCCM may be punctured into the dedicated channel. The confirmation message from the mobile terminal 7 may be combined with uplink user traffic on the dedicated channel, punctured into the dedicated channel or sent via common signalling channels. On receipt of confirmation messages from at least the minimum number of network elements, e.g. from the mobile terminal 7 and at least one of the base stations 17, 18, 55 which is in receiving and transmitting communication with the mobile terminal 7, the RNC initiates the change of configuration on the uplink. The present invention includes waiting before application of the new configuration until confirmations have been received from base stations which provide a at least a minimum quality of service, e.g. bit error rate, signal strength. The RNC 8 then transmits an uplink new configuration apply message to the mobile terminal 7. This message may be transmitted via node B and/or node B', i.e. the network elements softer handover controller 9, site controller 12 and base stations 17, 18, RNC 51, softer handover controller 52, site controller 53 and base station 55 which all note the implementation of the change of configuration by one of the detection methods described above, i.e. either a direct or indirect method. The mobile terminal 7 may detect the change in configuration by one of the methods described above, i.e. either indirect or direct. On receipt of the uplink apply message, the mobile terminal 7 changes its transmit parameters to transmit future user messages on the dedicated channels with the new configuration and begins transmissions on the dedicated uplink channels with the new configuration. This is detected by node B and/or node B', i.e. the network elements, base stations 17, 18, 55, site controllers 12, 53 and softer handover controllers 9, 52 as well as RNC's 8, 55, all of which detect the change to the new TFCI for the uplink by one of the methods described above, i.e. indirect or direct. On receipt of one or more indications of the change of uplink configuration, the RNC 8 applies the new configuration in the downlink. On detection of these downlink messages by the mobile terminal 7 by one of the methods described above, i.e. indirect or direct, the mobile terminal 7 changes its receiver parameters to the new configuration and sends an apply confirm message to the RNC 8.

While the invention has been shown and described with reference to preferred embodiments, it will be understood by those skilled in the art that various changes or modifications in form and detail may be made without departing from the scope and spirit of this invention as defined in the attached claims.

The invention claimed is:

1. A method of operating a telecommunications system in which mobile terminals communicate with base station transceivers over an air interface, a communication to another user terminal being supported in macrodiversity by radio links between a plurality of base station transceivers and a mobile terminal, the radio links in macrodiversity having a set of common radio link configuration parameters, the method comprising the steps of:

transmitting a radio link configuration change message to each of the plurality of base station transceivers and the mobile terminal, the radio link configuration change message defining a new transport format set which represents a combination of valid radio link configuration parameters that can be used on the radio links; and waiting before using the new meaning of the transport format set until an acknowledgement has been received from at least one base station transceiver in transmitting communication with the mobile terminal, at least one base station transceiver in receiving communication with the mobile terminal and the mobile terminal.

2. The method according to claim 1, wherein the waiting step includes waiting for confirmation from a base station transceiver in receiving communication with the mobile terminal which provides a minimum quality of service.

3. The method according to claim 1, further comprising the step of transmitting a radio link configuration apply message after receipt of the confirmation messages.

4. The method according to claim 3, wherein the apply message is transmitted first to the mobile terminal for application of the new configuration to uplink messages from the mobile terminal, and the apply message is transmitted to the base station transceivers for application of the new configuration to transmissions in the downlink only after receipt of uplink transmissions in accordance with the new configuration.

5. The method according to claim 1, wherein a change in common configuration is detected by a change in a property of received signals.

6. The method according to claim 5, wherein the property is the polarity of error detection data.

7. The method according to claim 1, wherein the radio links include dedicated channels for the transmission of control data and user data between the mobile terminal and the plurality of base station transceivers, and transmissions on the dedicated channels include a transmit format combination indicator for indicating the currently valid combination of common transmission parameters of the radio links.

8. The method according to claim 1, wherein the common radio link configuration includes at least one of transport block size, transport block set size, transmission time interval, type of channel coding, type of channel interleaving, rate matching or a combination of these.

9. A telecommunication system in which mobile terminals communicate with base station transceivers over an air interface, a communication between a mobile terminal in macrodiversity and another user terminal being connected by radio links to a plurality of base station transceivers, the radio links having a set of common radio link configuration parameters, the system comprising:
- a network element adapted for transmitting a change in radio link configuration message to the plurality of base station transceivers and the mobile terminal, the radio link configuration change message defining a new meaning for a transport format set which represents a combination of valid radio link configuration parameters that can be used on the radio links, and for waiting before using the new meaning of the transport format set for an acknowledgement of the receipt of the change message from at least one the base station transceiver in transmitting communication with the mobile terminal, at least one base station transceiver in receiving communication with the mobile terminal and the mobile terminal.

10. The system according to claim 9, wherein the system is adapted to wait for confirmation from a base station transceiver in receiving communication with the mobile terminal which provides a minimum quality of service.

11. The system according to claim 9, wherein the mobile terminal is adapted to change a property of transmissions on change of the uplink configuration.

12. The system according to claim 11, wherein the change in property is the polarity of error detection data.

13. The system according to claim 9, wherein the network element is also adapted to transmit a radio link configuration apply message after receipt of the confirmation messages.

14. The system according to claim 13, wherein the network element is adapted to transmit the apply message first to the mobile terminal for application of the new configuration to uplink messages from the mobile terminal, and to transmit the apply message to the base station transceivers for application of the new configuration to transmissions in the downlink only after receipt of uplink transmissions in accordance with the new configuration.

15. A network element for use in a telecommunication system in which mobile terminals communicate with base station transceivers over an air interface, a communication between a mobile terminal in macrodiversity and another user terminal being connected by radio links to a plurality of base station transceivers, the radio links having a set of common radio link configuration parameters, the network element being adapted for transmitting a change in radio link configuration message to the plurality of base station transceivers and the mobile terminal, the radio link configuration change message defining a new meaning for a transport format set which represents a combination of valid radio link configuration parameters that can be used on the radio links, and for waiting before using the new meaning of the transport format set for an acknowledgement of the receipt of the change message from at least one the base station transceiver transmitting messages to the mobile terminal, at least one base station transceiver receiving messages from the mobile terminal and the mobile terminal.

16. The network element according to claim 15, wherein the network element is adapted to wait for confirmation from a base station tranceiver in receiving communication with the mobile terminal which provides a minimum quality of service.

17. A method of operating network element in a telecommunications system in which mobile terminals may communicate with base station transceivers over an air interface, a communication to another user terminal being supported in macrodiversity by radio links between a plurality of base station transceivers and a mobile terminal, the radio links having a set of common radio link configuration parameters, the method comprising the steps of:
- transmitting from the network element a radio link configuration change message to each of the plurality of base station transceivers and the mobile terminal, the radio link configuration change message defining a new meaning for a transport format set which represents a combination of valid radio link configuration parameters that can be used on the radio links; and
- waiting before using the new meaning of the transport format set until an acknowledgement has been received from at least one base station transceiver transmitting messages to the mobile terminal, at least one base station transceiver receiving messages from the mobile terminal and the mobile terminal.

18. The method according to claim 17, wherein the waiting step includes waiting for confirmation from a base station transceiver in receiving communication with the mobile terminal which provides a minimum quality of service.

19. A mobile terminal for use in a telecommunications system in which the mobile terminal may communicate with base station transceivers over an air interface, a communication to another user terminal being supported in macrodiversity by radio links between a plurality of base station transceivers and the mobile terminal, the radio links having a set of common radio link configuration parameters, the mobile terminal being adapted to receive a radio link configuration change message, the radio link configuration change message defining a new meaning for a transport format set which represents a combination of valid radio link configuration parameters that can be used on the radio links, and to transmit a confirmation of receipt of this message and to apply the new common configuration on uplink transmissions after receipt of a configuration apply message.

20. The method according to claim 1, wherein the new transport format set is identified by transport format combination indicator (TFCI) which represents the combination of valid radio link configuration parameters that can be used on the radio links.

21. The telecommunication system according to claim 9, wherein the new transport format set is identified by transport format combination indicator (TFCI) which represents the combination of valid radio link configuration parameters that can be used on the radio links.

22. The network element according to claim 15, wherein the new transport format set is identified by transport format combination indicator (TFCI) which represents the combination of valid radio link configuration parameters that can be used on the radio links.

23. The method according to claim 17, wherein the new transport format set is identified by transport format combination indicator (TFCI) which represents the combination of valid radio link configuration parameters that can be used on the radio links.

24. The mobile terminal according to claim 19, wherein the new transport format set is identified by transport format combination indicator (TFCI) which represents the combination of valid radio link configuration parameters that can be used on the radio links.

* * * * *